United States Patent

[11] 3,548,084

[72] Inventor Klaus Kroner
Hamburg, Germany
[21] Appl. No. 714,575
[22] Filed March 20, 1968
[45] Patented Dec. 15, 1970
[73] Assignee U. S. Philips Corporation
New York, N.Y.
a corporation of Delaware. by mesne assignment
[32] Priority April 5, 1967
[33] Netherlands
[31] No. 6704809

[54] COLOR KILLING CIRCUIT WITH A PASSIVE SUBCARRIER REGENERATOR
4 Claims, 1 Drawing Fig.

[52] U.S. Cl. .......... 178/5.4
[51] Int. Cl. .......... H04n 9/48
[50] Field of Search .......... 178/5.4CK, 5.4P, 5.4

[56] References Cited
FOREIGN PATENTS
1,164,466 3/1964 Germany .......... 178/5.4

*Primary Examiner*—Robert L. Griffin
*Assistant Examiner*—John C. Martin
*Attorney*—Frank R. Trifari

ABSTRACT: A color television receiver employs a passive subcarrier generator, and a synchronous demodulator for the burst signal. The output of the burst demodulator is filtered at a frequency of one-half of the line frequency, and then demodulated to produce a control voltage for the color-killing switch in the chrominance channel.

PATENTED DEC 15 1970
3,548,084
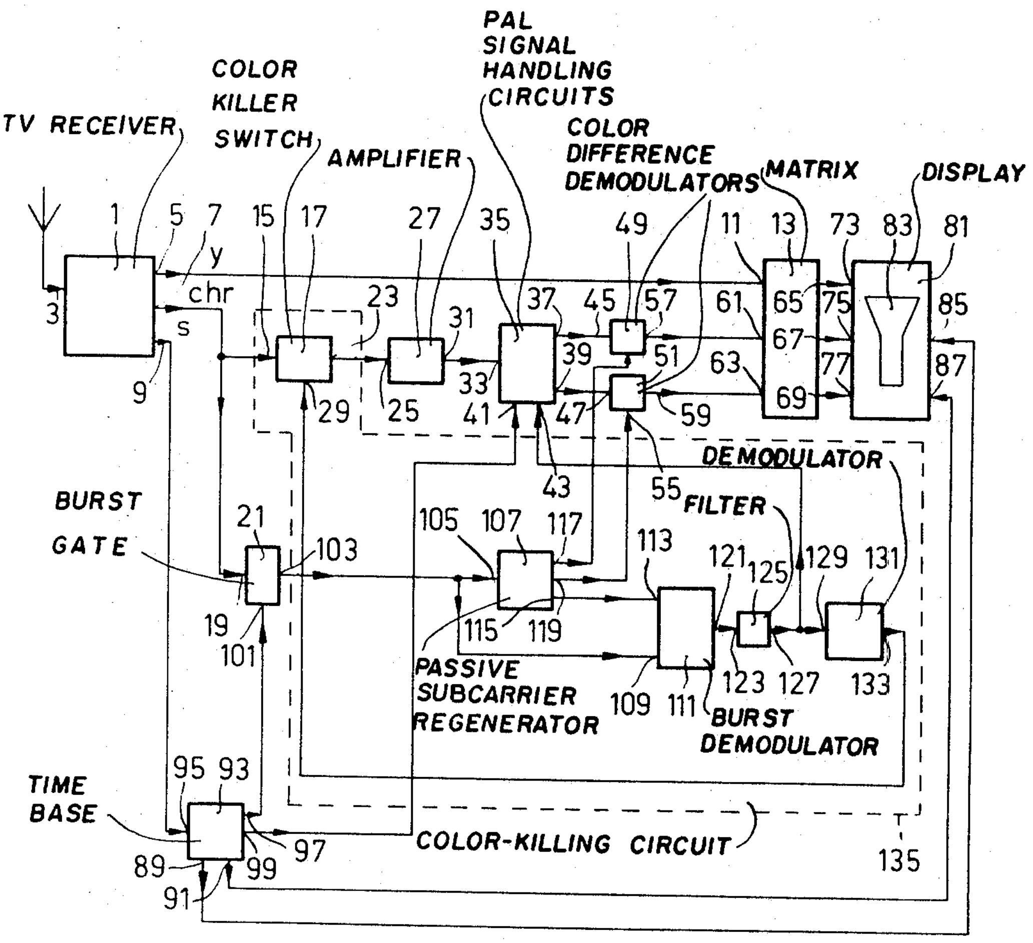
INVENTOR.
KLAUS KRONER
BY
AGENT

COLOR KILLING CIRCUIT WITH A PASSIVE SUBCARRIER REGENERATOR

This invention relates to a color television receiver for the color display of an incoming color television signal and the black and white display of an incoming black and white television signal. The receiver includes a color-killing switch operated by a color-killing signal for switching off and switching on a color signal handling channel in black and white reception and in color reception respectively, a color-subcarrier regenerator and a synchronous color-subcarrier burst detector having two inputs for applying respectively a color subcarrier burst signal to be demodulated, which may be derived from an incoming color television signal, and a reference signal which may be derived from the color-subcarrier regenerator, and having an output to which an input of a filter circuit for allowing passage of signals of half the line frequency is connected, an output of said filter circuit being connected to a demodulating circuit which provides a color-killing signal controlling the color-killing switch.

From "Mullard Technical Communications", vol. 9, 85 Jan. 1967 a color television receiver of the above-mentioned kind is known in which the color-subcarrier regenerator is of the active type, that is to say this regenerator is self-oscillating and provides a reference signal of approximately the color subcarrier frequency, independently of whether a signal is applied to the receiver or not. When a color television signal is received, said reference signal is made identical in frequency and phase with the frequency and phase of the color-subcarrier.

Such a receiver has the disadvantage that upon reception of a black and white television signal the color-killing signal may assume a value such that the color-killing switch. Color disturbances then appear in the picture and if the receiver has a so-called white-point switch, the hue of the picture also changes.

An object of the invention is to obviate these disadvantages.

A receiver of the kind mentioned in the preamble is in accordance with the invention characterized in that the color subcarrier regenerator is of a passive type.

The invention underlies recognition of the fact that in color television receivers of both the PAL-type and the NTSC-type no signal of half the line frequency can appear at the output of the color subcarrier signal detector during reception of a black and white signal. However, this is the case, when a color television signal is received.

If, however, a color subcarrier regenerator of the active type is used in conventional receivers of the kind mentioned in the preamble, then a signal of half the line frequency can appear at the output of the color subcarrier detector upon reception of a black and white signal. In fact, this is the case if upon reception of a black and white television signal a harmonic of the line frequency appears at the synchronous color subcarrier demodulator which harmonic lies in frequency at a distance equal to half the line frequency from the reference signal frequency presented to the demodulator by the active color subcarrier regenerator. Such a harmonic may appear indeed at the color subcarrier burst input of the synchronous burst demodulator upon reception of a black and white signal, since this signal includes parasitic peak signals with very high harmonics of the line frequency in the signal that is keyed out in a burst gate and applied to the said demodulator. Said harmonics are presented to the synchronous burst demodulator and, for a given line frequency, may exhibit a difference of half the line frequency relative to the reference signal produced by the active color subcarrier regenerator. In fact, black and white transmitters often have their line frequency synchronized to the power main frequency which may vary slightly, so that the transmitters can exhibit a line frequency at which such a difference occurs. A signal of half the line frequency then appears at the output of the said demodulator, thus permitting the color signal handling channel to be switched on.

Since in a receiver according to the invention, during black and white reception, the signal to be demodulated and due to the passive regenerator, the reference signal as well can include only higher harmonics of the line frequency, a signal of half the line frequency never appears at the said burst demodulator.

This is, however, the case upon reception of a color signal, since with a PAL-signal the phase of the burst signal changes from line to line, whereas with the NTSC-signal the color subcarrier frequency is an odd multiple of half the line frequency. The changeover from black and white to color display, and vice versa, is thus very reliable in a receiver according to the invention.

It is to be noted that the use of a color-subcarrier regenerator of the passive type in color television receivers is known per se from "TelefunkenZeitung", vol. 37, 1964, No. 2, pages 100—102.

In order that the invention may be readily carried into effect, it will now be described in detail, by way of example, with reference to the accompanying diagrammatic drawing, showing a PAL-color television receiver according to the invention.

In the FIG. section 1 is the section of the receiver in which a television signal received from an input 3 is RF- and IF-amplified, demodulated and split into partial signals in, for example, a known manner. The partial signals appear at outputs 5, 7, 9 of section 1. A luminance signal Y applied to an input 11 of a matrix circuit 13 appears at the output 5. Upon reception of a color television signal a chrominance signal Chr appears at the output 7 and is applied to an input 15 of a color-killing switch 17 and to an input 19 of a burst gate 21. The color-killing switch 17 has an output 23 at which the chrominance signal appears upon reception of a color television signal at the input 3, which signal is applied through an input 25 to a chrominance amplifier 27. Upon reception of a black and white television signal at the input 3, no signal appears at the output 23 of the color-killing switch 17. The signal for operating the color-killing switch 17 is a color-killing signal applied to an input 29 thereof. A chrominance signal set up at the input 25 of the chrominance amplifier 27 appears in amplified form at an output 31 thereof and is applied to an input 33 of a PAL-signal handling device 35. The PAL-signal handling device 35 includes, for example, the known means for delaying, summating and, by means of a PAL-switch, phase switching from line to line, the chrominance signal appearing, splitted in color-difference signals, at outputs 37 and 39. The PAL-signal handling device 35 also has two inputs 41 and 43 for applying respectively a line frequency switching signal and an identifying signal of half the lien frequency for matching the PAL-signal handling device in the correct way to the kind of the chrominance signal. The outputs 37 and 39 are connected to inputs 45 and 47 of two color-difference signal demodulators 49 and 51. These demodulators have inputs 53 and 55, respectively, for applying thereto a reference signal and outputs 57 and 59, respectively, for providing a demodulated color-difference signal to inputs 61 and 63 of the matrix circuit 13. The matrix circuit 13 has a plurality of outputs 65, 67, 69 for providing color signals composed in the matrix circuit 13, that is to say red R, green G and blue B, to inputs 73, 75, 77 of a picture display section 81. Said signals are suitable for displaying a color picture on a display tube 83. It is also possible to derive three color-difference signals from the matrix circuit 13 and to apply the luminance signal Y directly to the display tube 83.

The display section 81 also has a plurality of inputs 85, 87 for supplying deflection currents to the display tube 83. To this end, the inputs 85, 87 are connected to outputs 89, 91 of a time-base device 93. An input 95 thereof is connected to the output 9 of section 1 for applying thereto a synchronising signal S obtained at the output 9 from the incoming television signal. The time-base device 93 also has two outputs 97 and 99. The output 97 gives off line frequency keying pulses to an input 101 of the burst gate 21. The output 99 provides a line frequency switching signal to the input 41 of the PAL-signal handling device 35. The burst gate 21 has an output 103 at which a signal appears which is present in the television signal upon the occurrence of the keying pulses.

The signal at the output 103 is the burst signal when the color television signal is received at the input 3. Upon reception of a black and white signal at the input 3, this may be a parasitic signal including harmonics of the line frequency which are located in the frequency range in which the chrominance signal Chr is situated. The signal at the output 103 is applied to an input 105 of a color subcarrier regenerator 107, which must be of the passive type in accordance with the invention, and to an input 109 of a synchronous color subcarrier burst demodulator 111, another input 113 of which is connected to an output 115 of the color subcarrier regenerator 107 for obtaining therefrom a reference signal. The color subcarrier regenerator 107 also has two outputs 117, 119 which are connected to the inputs 53, 55 of the color-difference demodulators 49, 51 for applying reference signals thereto. The synchronous color subcarrier burst demodulator 111 has an output 121 for applying the demodulated signal to an input 123 of a filter circuit 125 which allows passage of half the line frequency. The filter circuit 125 has an output 127 for giving off a signal of half the line frequency which occurs in color reception to an input 129 of a demodulating circuit 131 and to the input 43 of the PAL-signal handling device 35. The demodulating circuit 131 has an output 133 which is connected to the input 29 of the color-killing switch 17 for feeding a color-killing signal thereto.

The color subcarrier regenerator 107, the synchronous color subcarrier demodulator 111, the filter circuit 125, the demodulating circuit 131 and the color-killing switch 17, together with their mutual connections, constitute a color-killing circuit 135 in a television receiver according to the invention.

The color-killing circuit 135 according to the invention operates as follows:

When a color television receiver is received by the receiver, a color subcarrier burst signal keyed out in the burst gate 21, appears at the input 105. Said burst signal is amplified in the color subcarrier regenerator and filtered, for example, by means of a crystal filter, and then applied in a given phase relationship to the outputs 117, 119 and 115, so that reference signals of the color subcarrier frequency appear on said outputs with suitably chosen phases. The burst signal is synchronously demodulated in the synchronous demodulator 111. In the PAL-color television signal the phase of the burst signal changes from line to line so that a voltage including an alternating voltage component of half the line frequency appears at the output 121. The voltage appearing at the output 121 is deprived of any direct current component by the filter circuit 125 and fed to the demodulating circuit 131 which converts the alternating voltage component of half the line frequency into a direct voltage (color-killing signal) which appears at the output 133 with a value such that the color-killing switch 17 operated by it allows the chrominance signal presented to its input 15 to pass towards its output 23.

When a black and white signal is received by the television receiver according to the invention a parasitic signal keyed out by the burst gate 21 may be presented to the input 105 of the passive color subcarrier regenerator 107. This parasitic signal includes harmonics of the line frequency which are presented to the color subcarrier regenerator 107 and to the synchronous burst demodulator 111. Black and white transmitters are often coupled with their line frequency to the power mains, so that the line frequency can vary due to variations in the power mains frequency. The line frequency of the incoming black and white signal may then become such that the regenerator 107 responds to a harmonic thereof. The synchronous burst demodulator 111 will then give off an output signal which may include a direct voltage component and components of the line frequency and a multiple thereof. However, these are not passed by the filter circuit 125. No signals are then presented to the demodulator circuit 101 and a voltage (color-killing signal) appears at the output 133 such that the color-killing switch 17 assumes its blocked position and does not admit signals to the chrominance amplifier 27.

Due to the use of a passive color subcarrier regenerator in the color-killing circuit 135, it is impossible at any line frequency of the black and white television signal that a component of half the line frequency appears at the output 127 of the filter circuit 125. The color-killing circuit 135 according to the invention thus operates in a very reliable manner and parasitic color signals cannot occur in the picture during black and white reception or on changing over the hue.

I claim:

1. A color television receiver for the color display of an incoming color television signal and the black and white display of an incoming black and white television signal, which receiver includes a color-killing switch operated by a color-killing signal for switching off and switching on a color signal handling channel in black and white reception and in color reception respectively, a color-subcarrier regenerator and a synchronous color-subcarrier burst detector having two inputs for applying respectively a color subcarrier burst signal to be demodulated and a color reference signal and having an output to which an input of a filter circuit for allowing passage of signals of half the line frequency is connected, an output of said filter circuit being connected to a demodulating circuit which provides a color-killing signal controlling the color-killing switch, characterized in that the color subcarrier regenerator is of a passive type.

2. A color television receiver as claimed in claim 1, for handling a PAL-color television signal in which the kind of the color information changes from line to line, including an identification circuit operated by an identifying signal, for matching the color information handling channel from line to line to the kind of color information to be dealt with, characterized in that the identifying signal for operating the identification circuit is also derived from the said filter circuit.

3. A television receiver for the reception of black and white, as well as color, television signals, said receiver comprising a chrominance channel including a color-killing switch for passing signals only during the reception of chrominance signals, a burst gate connected to pass burst signals, a passive color subcarrier regenerator connected to receive the output of said burst gate, a synchronous burst demodulator connected to receive outputs of said burst gate and said subcarrier regenerator, a filter circuit for passing signals of half the line frequency of said television signals connected to the output of said demodulator, and demodulating circuit means connected to the output of said filter circuit for producing a control voltage for said color-killing switch.

4. A television receiver as claimed in claim 3 further comprising means for identifying a PAL-color signal having an input terminal coupled to said switch and a control terminal coupled to said filter circuit.